(12) United States Patent
Birkinshaw et al.

(10) Patent No.: US 6,780,205 B2
(45) Date of Patent: Aug. 24, 2004

(54) VAT ACID DYEING OF TEXTILE FIBERS

(75) Inventors: Stephen M. Birkinshaw, Collingham (GB); Samit N. Chevli, Wilmington, DE (US); Michael O. Hunt, Jr., Wilmington, DE (US); Lee D. Jones, Pontefract (GB); David M. Lewis, Otley (GB); David J. Marfell, Moreton-In-Marsh (GB)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/224,096

(22) Filed: Aug. 20, 2002

(65) Prior Publication Data

US 2003/0110580 A1 Jun. 19, 2003

Related U.S. Application Data

(60) Provisional application No. 60/313,794, filed on Aug. 21, 2001.

(51) Int. Cl.$^7$ ................................................. D06P 1/22
(52) U.S. Cl. ...................... 8/587; 8/592; 8/594; 8/650; 8/653; 8/922; 8/924; 8/925; 8/926; 8/529
(58) Field of Search ............................. 8/529, 587, 592, 8/594, 650, 653, 922, 924, 926, 925

(56) References Cited

U.S. PATENT DOCUMENTS

| | | |
|---|---|---|
| 2,627,449 A | 2/1953 | Luttringhaus et al. |
| 3,353,900 A | 11/1967 | Hirshfield et al. |
| 3,527,556 A | 9/1970 | Riley |
| 6,007,587 A | 12/1999 | Gang et al. |

FOREIGN PATENT DOCUMENTS

| | | |
|---|---|---|
| GB | 534085 | 2/1941 |
| GB | 709150 | 5/1954 |
| GB | 712418 | 7/1954 |
| GB | 1383451 | 2/1975 |
| GB | 1415837 | 11/1975 |
| GB | 1430179 | 3/1976 |
| WO | WO96/04420 | 2/1996 |
| WO | WO98/03725 | 1/1998 |

OTHER PUBLICATIONS

Etters, J.N. and Ghiya, V., Dyeing Unmodified Polypropylene Fiber Garmeins: Are Acid Leuco Vat Dyes The Answer?, American Dyestuff Reporter, Mar. 1997, pp. 15–18, 66.

Chevli, Samit N., Applications of Leuco Vat Acid Dispersion on Polyester (Master's Thesis, University of Leeds, UK, 1997).

Lyle, C.G., Iannarone, J. J., and Thomas, R.J., High–Temperature Dyeing of New Synthetic Fibers, American Dyestuff Reporter, Sep. 17, 1951, pp. 585–596.

The Merck Index, An Encyclopedia of Chemicals and Drugs, $8^{th}$ Edition, Merck & Co., 1968, p. 959.

Rongolit®C Trade Literature, BASF (TVT 5952,e), Feb. 1997.

*Primary Examiner*—Margaret Einsmann
(74) *Attorney, Agent, or Firm*—Robert B. Furr, Jr.

(57) ABSTRACT

A process for dyeing certain textile fibers, utilizing vat acid dyeing and specific additional (second) reducing agents such as α-hydroxyalkylsulfinic acids, their salts and 1,2,4-trithiolane, resulting in excellent depth of shade and washfastness, is provided.

11 Claims, No Drawings

VAT ACID DYEING OF TEXTILE FIBERS

This application claims benefit to application No. 60/313,794 filed on Aug. 21, 2001.

FIELD OF THE INVENTION

This invention relates to a method of dyeing textile fibers using a vat acid dyeing method and, more particularly, to a vat acid dyeing method which utilizes additional reducing agent(s) to dye a variety of fibers to obtain deep shades and excellent washfastness.

DESCRIPTION OF BACKGROUND ART

Vat alkaline dyeing processes for use with textile fibers are known; see, for example, British Patent 534,085, International Patent Application WO96/04420, and U.S. Pat. No. 3,353,900. A vat neutral dyeing process has been disclosed for use with polypropylene fibers, American Dyestuff Reporter, March 1997, pp. 15–18, 66.

Vat acid dyeing processes have been disclosed in British Patents 709,150 (in which, however, the reduced dye is reoxidized before the dyeing step), 712,418 and 1,383,451, U.S. Pat. Nos. 2,627,449 and 3,527,556, Applications of Leuco Vat Acid Dispersion on Polyester (S. N. Chevli, Master's Thesis, University of Leeds, UK, 1997), and American Dyestuff Reporter, Sep. 17, 1951, pp. 585–596.

The use of sulfinic acid reducing agents in alkaline vat dyeing has been disclosed in U.S. Pat. No. 6,007,587 and British Patent 1,430,179 and, in post-dyeing reduction clearing, in International Patent Application WO98/03725. The use of sodium formaldehyde sulfoxylate with vat dyes in printing and its instability in dilute acids have been disclosed in The Merck Index, Eighth Edition, Merck & Co., Inc., 1968, p. 959 and in Rongolit® C trade literature from BASF (TI/T 5952e, February 1997).

However, none of these processes provides adequate depth of shade, washfastness, or stain-resistance, and an improved dyeing method is still needed.

SUMMARY OF THE INVENTION

The process of the present invention for dyeing a fiber comprising a synthetic polymer selected from segmented polyurethanes, segmented polyurethaneureas, segmented polyetheresters, polyesters, polyamides, and poly(metaphenylene isophthalamide), comprises the steps of:
(a) preparing a vat acid dye by:
  (i) reducing a vat dye with a first reducing agent in water in presence of a surfactant at an alkaline pH; and
  (ii) lowering the pH by the addition of a carboxylic acid;
(b) forming a dyebath by combining:
  (i) said vat acid dye;
  (ii) an aqueous solution of a carboxylic acid having a pH of about 5.2–6.5; and
  (iii) a second reducing agent in an amount sufficient to maintain said dye in a reduced state, wherein said second reducing agent comprises at least about 20 mole %, based on the total of said second reducing agent, of a compound selected from the group consisting of α-hydroxyalkyl-sulfinic acids having 1–6 carbon atoms, water soluble salts thereof, 1,2,4-trithiolane and mixtures thereof;
(c) contacting said fiber with said dyebath and heating to at least about 95° C. for a time sufficient to dye the fiber; and
(d) oxidizing the dye in the fiber.

Also provided is a solid mixture comprising at least one vat acid dye, at least one carboxylic acid having 12–22 carbon atoms, at least one reducing agent selected from the group consisting of sodium dithionite, α-hydroxyalkylsulfinic acids having 1–6 carbon atoms, water-soluble salts of such acids, sodium dithionite, 1,2,4-trithiolane, and mixtures thereof, and at least one surfactant.

DETAILED DESCRIPTION OF THE INVENTION

It has now been unexpectedly found that deeply dyed textile fibers can be obtained by a vat acid dyeing process in which the pH is in a particular range during dyeing, additional selected reducing agent is added during the dyeing step, and the dyeing takes place at or above a specified minimum temperature. These dyed fibers have excellent washfastness and a low propensity to stain other fibers.

As used herein, "spandex" means a manufactured fiber in which the fiber-forming substance is a long chain synthetic polymer comprised of at least 85% by weight of a segmented polyurethane; fibers similarly comprising a segmented polyurethaneurea (a sub-class of segmented polyurethanes) are also within the definition of spandex. By "segmented" is meant a polymer which has a plurality of segments of two classes. Each segment of the first class is the residue remaining after removal of the terminal hydrogen atoms from a polymeric glycol. The glycols typically have a melting point below 50° C. and a number-average molecular weight above 600. Each segment of the second class contains at least one repeating unit of a fiber-forming polymer, typically having a melting point above 200° C. "Vat dye" means a colored aromatic compound containing two or more carbonyl groups conjugated with each other through double bonds. Vat dyes are generally used by reducing and dissolving them with a reducing agent in the presence of strong base, contacting the fibers to be dyed with the reduced dye, and then oxidizing the dye to its colored form in the fiber. Vat dyes are to be distinguished from "solubilized vat dyes" in that the latter are sulfuric acid esters of corresponding reduced vat dyes and have different chemical characteristics. "Vat acid dyeing process" means a process in which, after reduction and dissolution of the dye, the dye solution is made acidic before contact is made with the fiber. "Blends" of fibers means fibers which have been mingled with each other, for example by covering one fiber with another, by mechanically- or jet-mingling them, or by simultaneously knitting or weaving the fibers into a fabric.

The sodium salt of hydroxymethylsulfinic acid, generally available as the monosodium salt dihydrate, $HOCH_2SO_2Na \cdot 2H_2O$, is also known as sodium formaldehyde sulfoxylate and hydroxymethanesulfinic acid (sodium salt); sodium dithionite is also known as sodium hydrosulfite.

In the process of the invention, a vat acid dye is formed by reducing a vat dye with a first reducing agent in water at an alkaline pH and lowering the pH of the resulting solution with a carboxylic acid, preferably to about pH 5.2–6.5 (more preferably to about 5.5–6.0), to form the vat acid dye in leuco form. The first reducing agent can be selected from sodium dithionite, 1,2,4-trithiolane, α-hydroxyalkylsulfinic acids, water-soluble salts thereof, and mixtures thereof. The weight ratio of reducing agent to vat dye is preferably at least 2 to 1, more preferably at least 3 to 1, to fully convert the vat dye to its leuco form. A surfactant is added before lowering the pH of the solution of reduced alkaline vat dye.

Anionic surfactants are preferred for improved stability against settling of the vat acid dye from the water. For greater storage stability, additional reducing agent can be added to the solution of vat acid dye, for example about 15 wt % based on total solution.

Examples of dyes that can be used in the method of the invention include Colour Index (C.I.) Vat Blue 1(indigo), C.I. Vat Violet 1 (indanthrene brilliant violet), C.I. Vat Green 1 (indanthrene brilliant green), C.I. Vat Orange 15 (duranthrene orange), C.I. Vat Red 41 (thioindigo), C.I. Vat Red 13 (indanthrene red), and mixtures thereof, but any vat dye or vat dye mixture that is stable to the conditions of the dyeing process and can subsequently be oxidized to its corresponding pigment form can be used. For instance, a deep black color can be obtained on polyester bicomponent fibers (for example, comprising poly(ethylene terephthalate) and poly(trimethylene terephthalate)) using a mixture of 3 wt % Vat Blue 1, 6 wt % Vat Blue 18 and 1.5 wt % Vat Orange 15. Dyes having one or two carbonyl groups (for example dibenzanthrones) were observed to give deeper shades than those having nitrogen-containing rings, and the former are preferred. Further, the fiber(s) to be dyed can affect the selection of the dye. For example, C.I. Vat Red 13 was observed to give deeper shades on polyamides, polyurethanes, and cotton than on polyester.

The vat acid dye and a second reducing agent which contains at least about 20 mole % (based on total second reducing agent) of a compound selected from the group consisting of 1,2,4-trithiolane, α-hydroxyalkylsulfinic acids having 1–6 carbon atoms, water-soluble salts of such acids (for example sodium, zinc, or potassium salts), and mixtures thereof are combined with an acid solution. Examples of useful sulfinic acid salts include $HOCH_2SO_2M$ (metal salt of hydroxymethylsulfinic acid; "M" represents a metal cation), $HOCH(CH_3)SO_2M$, $HOCH(CH_3)SO_2M$, $HOCH(C_2H_5)SO_2M$, $HOCH(C_3H_7)SO_2M$, $HOC(CH_3)_2SO_2M$, $HOC(C_2H_5)_2SO_2M$, the homologous series of $HOC(CH_3)(C_2H_5)SO_2M$ to $HOC(CH_3)(C_4H_9)SO_2M$, $HOC(C_2H_5)(C_3H_7)SO_2M$, $HOC_6H_{10}SO_2M$, and the like. Sodium hydroxymethylsulfinate is preferred due to its commercial availability and high solubility in water.

Fibers which can be dyed by the process of the invention include those comprising synthetic polymers selected from segmented polymers including segmented polyurethanes, segmented polyurethaneureas, and segmented polyetheresters; polyesters including poly(trimethylene terephthalate), poly(tetramethylene terephthalate), and poly(ethylene terephthalate); polyamides including poly(hexamethylene adipamide) and polycaprolactam and poly(meta-phenylene isophthalamide. Copolymers related to such polymers by the inclusion of comonomers can also be dyed by the present process. Bicomponent fibers dyeable by the process of the present invention include poly(trimethylene terephthalate)// poly(ethylene terephthalate), in which either polymer can be a copolyester for example with isophthalate, and poly (hexamethylene adipamide)//poly(hexamethylene-co-2-methylpentamethyl-ene adipamide), in which the copolyamide component is about 20–40 mole % 2-methylpentamethylene adipamide units.

When the fiber comprises a synthetic polymer selected from poly(tetramethylene terephthalate), poly(ethylene terephthalate), poly(hexamethylene adipamide), poly (metaphenylene isophthalamide), and polycaprolactam, the dyebath can have a pH of about 5.2–6.5, preferably about 5.5–6.0. When the fiber comprises a synthetic polymer selected from segmented polyurethanes, segmented polyurethaneureas, segmented polyetheresters, and poly (trimethylene terephthalate), the dyebath can have a pH of about 4.0–6.9, preferably about 5.2–6.5, so that the vat dye remains in its acid form. Blends of such fibers can also be dyed by the process of the invention.

It was particularly surprising that water-soluble salts of α-hydroxyalkylsulfinic acids had a beneficial effect in a vat acid dyeing process, since such compounds are said to be readily decomposed by dilute acid. Less than about 20 mole % of such a second reducing agent(s) confers little advantage in washfastness and only slightly improved depth of shade. The amount is preferably less than about 85 mole % of the total second reducing agent(s) in the dyeing step. With increasing levels of such acid salt reducing agent, the depth of shade, though still acceptable and useful, declines somewhat, and above about 85 mole %, most of the increase in the tensile strength of the dyed fabrics has been achieved. The practitioner can adjust the relative amounts of reducing agents used in the dyeing step within the scope of the invention to achieve the desired balance of depth of shade and fabric tensile strength.

The carboxylic acids found to be useful in forming the vat acid dye and in maintaining an acid pH during the dyeing step can include acetic acid, formic acid, citric acid, lactic acid, and mixtures thereof. Citric acid and formic acid are preferred for better depth of shade and washfastness.

During the dyeing step, the reducing agent and the acid are used in amounts sufficient to maintain the vat acid dye in a reduced state. The total amount of reducing agent(s) and acid(s) used can depend on the dyeing apparatus used. An apparatus which permits greater exposure of the dyebath to air and the space surrounding the dyebath will require more reducing agent and acid than an apparatus that restricts air oxidation and acid evaporation.

Optionally and for greater ease of handling, a pellet or cake can be made by contacting the alkaline leuco form of the dye (for example the disodium salt) with a carboxylic acid having 12–22 carbon atoms, such as stearic acid. The resulting solid mixture can comprise the vat dye in acid form even when the pH of the mixture is as high as 7. The vat acid dye is surprisingly stable against air oxidation when thus mixed with the carboxylic acid. For even greater stability, a reducing agent can be included in the solid mixture. The solid mixture can be used with the dyeing process of the present invention, with vat acid dyeing processes outside the scope of the present invention, and with conventional (alkaline or neutral) vat dyeing processes. In the last instance, the basic conditions of the dyebath are sufficient to re-convert the dye to its alkaline leuco form. Solid formulations of reducing agents such as sodium dithionite have been disclosed in U.S. Pat. No. 6,007,587 and British Patent 1,415,837.

The fiber, for example in a fabric, as a skein, or on a wound package, is then contacted with the dyebath, and the dyebath is heated to at least about 95° C., preferably at a rate in the range of about 0.5–2.0° C. per minute for deep dye shades. It is more preferred that the heating rate be in the range of about 0.5–1.0° C. per minute for even deeper shades. Fabric tensile properties can decline somewhat with slower heating rates, which can be adjusted to achieve the desired balance depth of shade and fabric tensile strength.

When the synthetic fiber comprises a polymer selected from polyurethanes, polyurethaneureas, poly (hexamethylene adipamide), poly(trimethylene terephthalate), and poly(tetramethylene terephthalate), the dyebath can be heated to at least about 100° C., and when the fiber comprises poly(ethylene terephthalate), the dyebath can be heated to at least about 115° C. With bicomponent fibers comprising poly(trimethylene terephthalate) and poly (ethylene terephthalate), it was observed that when the dyeing temperature was increased from 115° C. to 130° C., the depth of shade and washfastness increased.

After a time sufficient for the dye to penetrate the fiber, the dye in the fiber is oxidized to its pigment form with an oxidizing agent. In the dye oxidation step, oxidants such as hydrogen peroxide, Oxydant Diresul® BRI and Oxydant Diresul® SZ (both based on sodium bromate, from Clariant) can be used. Hydrogen peroxide is preferred, because among the oxidants tested, it resulted in the best dye depth of shade and dye washfastness.

Finally, steps such as reduction clearing and/or soaping can be carried out if loosely fixed dye remains on the fiber surface.

Optionally, the oxidation step can be carried out after the dyeing step by adding sufficient oxidant to the dyebath to oxidize both the dye in the fiber and any residual reducing agent in the dyebath, without draining, refilling, and re-heating the dyebath. Doing so can save energy and water.

As an additional alternative, a reduction clearing step can be carried out before the oxidation step by cooling the dyebath (containing reducing agent and acid) to no higher than about 95° C., adding enough base to bring the pH to at least about 10 and carrying out the oxidation step. This can save reducing agent as well as energy and water.

Blends of synthetic fibers with natural fibers, for example cotton, lyocell, and the like, can also be dyed by the process of the invention, with the modification that a conventional vat alkaline dyeing step is carried out after the vat acid step and before the oxidation step to dye the cellulosic fibers in the blend. For example, after the vat acid dyeing step described above for the synthetic fibers, the dyebath can be cooled to no higher than 95° C. (preferably no higher than 50° C.), and sodium hydroxide (sufficient to raise the pH to at least about 10), alkaline reduced (leuco) vat dye (for example 2–3 wt % based on fiber), optionally more sodium dithionite (for example 1.5 wt % based on dyebath), optionally sodium sulfate (for example 2 wt % based on dyebath) and optionally nonionic detergent (for example 4 g/l of dyebath) can be added. The dyebath temperature can then be adjusted to at least about 60° C., maintained for 45 minutes, and cooled. Such an additional step also accomplishes reduction clearing on the synthetic fibers, as described above. Finally, the dye in the fiber can be oxidized and the fibers optionally soaped, as described elsewhere herein.

A buffer solution can be used to maintain a constant pH during any step of the inventive process. Such a solution can be prepared from a mixture of 0.2 M of the carboxylic acid and 0.1 M sodium dihydrogen phosphate, in the appropriate proportions.

The polyester bicomponent yarn used in the Examples was a 70 denier (78 decitex), 34-filament yarn comprising poly(trimethylene terephthalate) and poly(ethylene terephthalate), made by the following method. Poly(trimethylene terephthalate) (60 wt %, 1.24 intrinsic viscosity, "IV") and poly(ethylene terephthalate) (40 wt %, Crystar® 4415, a registered trademark of E. I. du Pont de Nemours and Company, 0.51 IV) were melted in independent melt systems, transported to a spinneret, and spun side-by-side into a cross-flow quench. Each component contained 0.3 wt % $TiO_2$. An organic ester-based emulsion finish was applied (5 wt %) to the yarn. The yarn was passed around a feedroll, through a 170-° C. steam draw jet, and then around a draw roll at a draw ratio of 2.9. The yarn was then passed through a 180-° C. hot chest containing two rolls at a second draw ratio of 1.3. About 7.5 turns were taken around the hot chest rolls. The yarn was passed around a puller roll and a letdown roll and then wound onto a paper core tube. The resulting fibers had a tenacity of 3.5 g/d (3.1 dN/tex), elongation-to-break of 13%, and a crimp contraction value of about 55%. Crimp contraction levels in the polyester bicomponent fiber used in the Examples were measured by hanging a loop of fiber from a holder with a 1.5 mg/denier (1.35 mg/dtex) weight attached to the bottom of the loop and measuring the length of the loop. Then, a 100-mg/den (90 mg/dtex) weight was attached to the bottom of the loop, and the length of the loop was measured again. Crimp contraction was calculated as the difference between the two lengths, divided by the length measured with the 90-mg/dtex weight.

K/S, which indicates depth of shade at a chosen wavelength, can be obtained from the Kubelka-Munk equation $$K/S = \frac{(1-R)^2}{2R}$$

wherein K is the absorption coefficient, S is the scattering coefficient, and R is the reflectance (the ratio of reflected to incident light). When K/S is plotted against wavelength over a range of 300–700 nm, f(k) is the area under the curve. To obtain the colorimetric data reported in the Examples, f(k) values were measured with an X-Rite, Inc. (Match-Rite model) reflectance spectrophotometer (Grandville, Mich.) using X-Rite personal computer software. A D65 light source was used; the specular component of the light was excluded, and the ultraviolet component was included. A 10° observer angle was used. For each test, the fabric sample was folded once so that a double thickness was presented to the light. Four readings were taken on each sample, the sample having been rotated 90° from each previous reading in order to avoid orientation effects. A higher f(k) value indicates better depth of shade in the dyed fabric.

The washfastness test method used in the Examples was ISO CO6/C2, and spectrophotometric measurements were taken on dyed fabric samples before and after they were so tested. Changes in fabric color resulting from the five washings stipulated in the test method are reported in the Examples as a percent change in f(k) and as ΔE (calculated according to the CMC (I,c) equation, as described in "Colour Physics for Industry", Second Edition, Roderick McDonald, ed., Society of Dyers and Colourists, pp 151–155, 1997):

$$\Delta E_{CMC(l:c)} = \left[\left(\frac{\Delta L^*}{lS_L}\right)^2 + \left(\frac{\Delta C^*_{ab}}{cSc}\right)^2 + \left(\frac{\Delta H^*_{ab}}{S_H}\right)^2\right]^{1/2}$$

wherein ΔL*, ΔC*$_{ab}$ and ΔH*$_{ab}$ are, respectively, the CIELAB lightness, chroma, and hue differences between the unwashed and washed samples, I and c are the tolerances applied, respectively, to differences in lightness and chroma relative to hue differences (the numerical values used in a given situation being substituted for the characters I and c, for example CMC(2:1), whenever there might be ambiguity), and:

$$S_L = \frac{0.040975 L^*_s}{1 + 0.01765 L^*_s} \text{ if } L^*_s \geq 16$$

and $S_L$=0.511 if L*$_s$<16;

$$S_C = 0.638 + \frac{0.0638 C^*_{ab,S}}{1 + 0.0131 C^*_{ab,S}}$$

and $S_H = S_C(TF+1-F)$ $$\text{wherein } F = \left[\frac{(C^*_{ab,S})^4}{(C^*_{ab,S})^4 + 1900}\right]^{1/2}$$

and $$T = k_{1*}[k_2 \cos(h_{ab,S} + k_3)]$$

wherein $L^*_S$, $C^*_{ab,S}$, and $h_{ab,S}$ are respectively the CIELAB lightness, chroma, and hue angle (in degrees) of the unwashed sample, and $$k_1 = 0.36, k_2 = 0.4, k_3 = 35 \text{ if } Hs \leq 164 \text{ or } Hs \geq 345,$$

and $$k_1 = 0.56, k_2 = 0.2, k_3 = 168 \text{ if } 164 < Hs < 345.$$

Small changes in f(k) and low values of ΔE indicate good washfastness. In qualitative tests, each fabric was rated on a 1–5 scale (1 poor, 5 excellent) after the five washings. For fibers dyed according to the process of the invention, all qualitative washfastness test results ratings were at least "4–5", and most were "5". Qualitative washfastness evaluations were also made of the staining propensity using the same test method on fabrics dyed by the process of the present invention. In this case, strips of the test fabric were washed adjacent to other fabrics of fibers such as wool, acrylic, poly(ethylene terephthalate), nylon 6-6, and cotton and cellulose acetate. The same 1–5 scale was used, and staining ratings for all the fabrics dyed by the process of the invention were at least "4" (very good), and most were "5".

The rubfastness test method used was ISO×12/1. Tensile tests made on the dyed fabrics were conducted according to British Standard 2576:1986.

Unless otherwise noted, all chemicals were reagent grade obtained from Aldrich Chemical Company, and all scouring, dyeing, reduction clearing, and soaping steps were carried out in sealed stainless steel dyepots of 300 cm³ capacity, housed in a Roaches "Pyrotec S" laboratory dyeing machine, the carousel of which was operated at 55 rpm. In each step, the solutions were added to the dyepot and warmed to 40° C. before adding the fabric, each sample of which weighed 10 g. The fabric was pre-wet with distilled water before the dyeing step. Between each step the dyepots were emptied and cleaned by rinsing them with warm tap water and then with distilled water, after which they were dried. Unless otherwise noted, 20 ml of aqueous solution was used for each gram of fabric in dyeing and reduction clearing, and 25 ml of aqueous solution was used per gram of fabric in scouring. After each dyeing and finishing step, the fabric was air-dried by hanging it up overnight.

EXAMPLE 1

An interlock double jersey knit fabric was made solely with bicomponent fibers of poly(ethylene terephthalate) and poly(trimethylene terephthalate) using 20 gauge needles and a machine diameter of 24 inches (61 cm); the greige wale and course counts were 15/cm and 19/cm, respectively.

The fabric was pre-scoured by placing the fabric and an aqueous solution of 3 g/l Sandoclean® PC (a nonionic surfactant, Clariant International, Ltd.) and 1 g/l sodium carbonate in a clean dyepot. The temperature in the dyepot was raised to 60° C., and the dyeing machine was operated for 30 minutes, after which the fabric was removed and rinsed with cold tap water for five minutes.

A vat acid dyestock solution of C.I. Vat Blue 1 was prepared by putting the dye (BASF) (2 wt % based on fabric weight), 1.6 g sodium dithionite (4 wt % based on dyestock solution), and 1.6 g sodium hydroxide (4 wt % based on dyestock solution) into 40 ml of distilled water at 50° C. and stirring the mixture briefly. If the exothermic dissolution of the sodium hydroxide raised the temperature of the mixture, it was cooled in a water bath or ice bath to minimize dye oxidation. Matexil® DA-N (a sodium ligno sulfonate surfactant, Uniqema) (1.6 g, 4 wt % based on dyestock solution) was promptly added, and as soon as the mixture no longer exhibited insoluble particles and its color was characteristic of the leuco form of Vat Blue 1 (that is, transparent and yellowish), the pH was adjusted to 5.7 with citric acid. Note that the color of the acid leuco Vat Blue 1 is creamy; an olive-green color would indicate insufficient reduction or excessive reoxidation of the dye. This dyestock solution was used within 30 minutes to avoid undue oxidation by air.

A series of dyebaths was prepared in a clean dyepot from 190 ml of a buffer solution ("McIlvaine" buffer, prepared from 0.2 M disodium hydrogen phosphate and 0.1 M citric acid, mixed in proportion to give a pH of 5.7), 2 g Matexil® DA-N (1 wt % based on final dyebath solution), 10 ml of the dyestock solution, and 4 g of either sodium dithionite or hydroxymethylsulfinic acid monosodium salt dihydrate (NaHMSA) (Rongolit® C, BASF), or various mixtures thereof (20 g/l based on final dyebath solution). The fabric was added and the temperature was raised to 130° C. at a rate of 0.5° C. per minute. Dyeing was continued at 130° C. for 45 minutes, after which the dyebath was cooled at 2° C./min to 70° C., and the fabric was rinsed with warm tap water and then with cold tap water.

To oxidize the dye in the fabric, the dyed fabric and 200 ml of an aqueous solution of 0.3 ml (1.5 g/l based on total solution volume) of 35 wt % hydrogen peroxide were placed in a clean dyepot, which was heated to 80° C. and operated for 15 minutes. The fabric was rinsed with cold water.

In a reduction clearing step, the dyed, oxidized fabric was placed in 200 ml of an aqueous solution containing 6.5 g/l sodium dithionite, 6.5 g/l sodium hydroxide, and 5 g/l nonionic surfactant (Sandoclean® PC) in a clean dyepot, which was heated to 60° C. and operated at that temperature for 15 minutes, after which the fabric was removed and rinsed with warm tap water and then with cold tap water.

The samples were colorimetrically and physically analyzed, and the results are summarized in Table I.

TABLE I

| Sample | Sodium dithio-nite (mole %) | NaHMSA (mole %) | Initial f(k) | f(k) after 5 washes | Change in f(k) (%) | ΔE | Wale tensile strength (Kg) | Course tensile strength (Kg) |
|---|---|---|---|---|---|---|---|---|
| Comp A | 100 | 0 | 634 | 529 | −16.6 | 1.95 | 8.9 | 12.0 |
| Comp B | 89 | 11 | 625 | 541 | −13.4 | 1.45 | 9.1 | 12.2 |

TABLE I-continued

| Sample | Sodium dithio-nite (mole %) | NaHMS A (mole %) | Initial f(k) | f(k) after 5 washes | Change in f(k) (%) | ΔE | Wale tensile strength (Kg) | Course tensile strength (Kg) |
|---|---|---|---|---|---|---|---|---|
| C | 78 | 22 | 579 | 554 | −4.3 | 0.59 | 9.4 | 12.6 |
| D | 67 | 33 | 572 | 558 | −2.4 | 0.30 | 9.8 | 12.9 |
| E | 57 | 43 | 559 | 549 | −1.8 | 0.19 | 10.0 | 13.0 |
| F | 47 | 53 | 501 | 498 | −0.6 | 0.10 | 10.1 | 13.2 |
| G | 37 | 63 | 484 | 482 | −0.4 | 0.08 | 11.0 | 13.8 |
| H | 28 | 72 | 480 | 480 | 0.0 | 0.06 | 12.0 | 14.5 |
| I | 18 | 82 | 456 | 455 | −0.2 | 0.05 | 12.7 | 15.0 |
| J | 9 | 91 | 438 | 437 | −0.2 | 0.03 | 13.1 | 15.8 |
| K | 0 | 100 | 419 | 418 | −0.2 | 0.02 | 13.5 | 16.3 |

As can be seen from the data in Table I, washfastness improved dramatically above about 20 mole % hydroxymethylsulfinic acid sodium salt. Improvements were also shown in wale and course tensile strength, albeit modestly, above about 85 mole %. Although f(k) declined as the mole percent of hydroxymethylsulfinic acid sodium salt increased, the depth of shade in the dyed fabrics was still visually satisfactory whenever it was used. Similar results were obtained when C.I. Orange 15 was used.

EXAMPLE 2

A single jersey fabric was knitted solely from 156 dtex Lycra® Type 138S spandex (a registered trademark of E. I. du Pont de Nemours and Company) with 15-gauge needles and a 4-inch (10.2 cm) machine diameter. The fabric was pre-scoured by placing it in a clean dyepot containing an aqueous solution of 2 g/l Lanapex® RK (an anionic surfactant, Uniqema) and 1 g/l sodium carbonate. The temperature in the dyepot was raised to 60° C., and the dyeing machine was operated for 20 minutes, after which the fabric was removed and rinsed with warm tap water for 5 minutes and then with cold tap water for 5 minutes.

C.I. Vat Blue 1 (Example 2A), C.I. Vat Red 13 (BASF) (Example 2B), and C.I. Vat Orange 15 (Town End (LEEDS) plc, West Yorkshire, U.K.)(Example 2C) were converted to their vat acid forms as follows. To 0.4 g of the dye in 15 ml distilled water was added 0.8 g sodium hydroxide and 0.8 g sodium dithionite at 50° C., and the mixture was stirred for three minutes. If the exothermic dissolution of the sodium hydroxide raised the temperature of the mixture, it was cooled in a water bath or ice bath to minimize dye oxidation. Then 0.8 ml of Matexil® DA-N was promptly stirred into the mixture, and as soon as the mixture no longer exhibited insoluble particles and its color was characteristic of the leuco forms, the pH was adjusted to 5.7–5.8 with citric acid to form the vat acid dye. Then, the volume of the mixture was adjusted to 20 ml by addition of distilled water, so that the resulting dyestock mixture was 2 wt % in dye. The mixture was used within about 30 minutes in order to minimize air-oxidation of the dye. In preparation for dyeing, 10 ml of the vat acid dyestock mixture (2 wt % dye based on weight of fiber) was mixed in a dyepot with 170 ml pH 5.8 "McIlvaine" buffer solution, 15 g/l (based on final total bath volume) Matexil® DA-N, and 20 g/l (based on final bath volume) of a sodium dithionite/Rongolit® C mixture (50/50 weight ratio, 47/53 mole ratio). "McIlvaine" buffer was added to bring the total dyebath volume to 200 ml. The scoured fabric was placed in the dyebath (liquor ratio 20:1), the temperature was raised to 98° C. at 1.5° C./min, and the dyeing machine was operated for 45 minutes at 98° C. Then the dyepot was cooled to 70° C., and the fabric was removed and rinsed in warm tap water for 5 minutes and then in cold tap water for 5 minutes.

In preparation for dye oxidation, 2 g of 35 wt % hydrogen peroxide was added to 170 ml of distilled water, followed by acetic acid to adjust pH to 4.5, and distilled water to make the final bath volume 200 ml. The dyed fabric was added to the bath (liquor ratio 20:1), the temperature was raised to 60° C., and the dyeing machine was operated for 15 minutes. The dyed, oxidized fabric was rinsed in warm tap water for 5 minutes and in cold tap water for 5 minutes.

In a reduction clearing step, 1.3 g sodium hydroxide, 0.5 g Lanapex® R (an anionic surfactant, Uniqema), the dyed and oxidized fabric, and 1.3 g sodium dithionite were added to a dyepot, the temperature was raised to 50° C., and the dyeing machine was operated for 15 minutes. The fabric was rinsed in warm tap water for 5 minutes and cold tap water for 5 minutes.

Colorimetric results are shown in Table II.

TABLE II

| | Initial f(k) | After Five Washes | | |
|---|---|---|---|---|
| Example | | f(k) | Change in f(k), % | ΔE |
| 2A | 360 | 351 | −3 | 0.3 |
| 2B | 515 | 495 | −4 | 0.8 |
| 2C | 199 | 186 | −7 | 1.4 |

The data in Table II show that the fabric had excellent depth of shade and washfastness. Staining of six adjacent fabrics during washing was 5 (excellent) for each fabric. In contrast, traditional methods of dyeing spandex have resulted in staining and poor washfastness and, therefore, the results obtained by the process of this invention were unexpected.

EXAMPLE 3

A plain interlock fabric was knitted solely with a semi-dull false-twist textured poly(hexamethylene adipamide) yarn (6-6 nylon) of 78 dtex and 34 filaments (E. I. du Pont de Nemours and Company) using a 30-inch (76 cm) machine diameter; the greige fabric wale and course counts were 18/cm and 20/cm, respectively.

Pre-scouring, dyeing and oxidation were carried out as described in Example 2, using C.I. Vat Blue 1 (Example 3A), C.I. Vat Red 13 (Example 3B), C.I. Vat Green 1 (BASF) (Example 3C), and C.I. Vat Orange 15 (Example 3D). A reduction clearing step was unnecessary. Fabric colorimetric data are summarized in Table III.

TABLE III

| Example | Initial f(k) | ΔE (after 5 washes) |
|---------|--------------|---------------------|
| 3A | 149 | 14.6 |
| 3B | 59 | 0.1 |
| 3C | 81 | 0.5 |
| 3D | 53 | 0.5 |

The data in Table III show that the process of the present invention provided satisfactory depth of shade and excellent washfastness with 6-6 nylon and C.I. Vat Red 13, C.I. Vat Green 1, and C.I. Vat Orange 15. In spite of the excellent depth of shade and modest washfastness observed with C.I. Vat Blue 1, staining of six adjacent fabrics by C.I. Vat Blue 1 during washing was rated "4–5" (good to excellent) for each fabric.

EXAMPLE 4

A circular-knit plated single jersey of 78 dtex, 68 filament Tactel® Type 3209 draw-textured poly(hexamethylene adipamide) and 44 dtex Lycra® Type 269B spandex (about 85/15 nylon/spandex by weight) was made with 28 gauge needles and a 26-inch (66 cm) machine diameter; the greige warp and course counts were 19/cm and 25/cm, respectively. Pre-scouring, dyeing and oxidation were carried out as described in Example 2, except that the dye was C.I. Vat Green 1. A reduction-clearing step was unnecessary. The fabric had good depth of shade and excellent washfastness. Before washing, its f(k) value was 78. After five washes, the value was lowered only slightly to 76. Overall color change was also low (ΔE=0.5).

EXAMPLE 5

A plain single jersey fabric entirely of 56 dtex, 34 filament Dacron® Type 5001 (a registered trademark of E. I. du Pont de Nemours and Company) dull poly(ethylene terephthalate) was knitted using a 26-inch (66 cm) machine diameter; the greige fabric wale and course counts were 18/cm and 24/cm, respectively. The fabric was pre-scoured and dyed as described in Example 2, except that the dyeing temperature was 130° C., and the dyes were C.I. Vat Red 41 (thioindigo, Holliday Dyes & Chemicals; Example 5A), C.I. Vat Blue 1 (Example 5B), and C.I. Vat Orange 15 (Example 5C). Oxidation was carried out similarly to that of Example 2, except that 4 g of 35 wt % hydrogen peroxide was used and it was carried out at 80° C. A reduction-clearing step similar to that of Example 2 was also used, except that it was performed at 60° C. Fabric colorimetric data are given in Table IV.

TABLE IV

| Example | Initial f(k) | ΔE (after 5 washes) |
|---------|--------------|---------------------|
| 5A | 132 | 0.1 |
| 5B | 142 | 0.4 |
| 5C | 54 | 0.9 |

As shown by the data in Table IV, the process of this invention afforded good depth of shade and excellent washfastness when used with poly(ethylene terephthalate) fibers. Staining of six adjacent fabrics by C.I. Vat Blue 1 during washing was rated "4–5" for each fabric.

EXAMPLE 6

A plain interlock fabric of 76 dtex, 32 filament false-twist textured Type 528 poly(tetramethylene terephthalate) was knitted using 28 gauge needles and a 30-inch (76 cm) machine diameter; the greige fabric wale and course counts were 18/cm and 20/cm, respectively. Pre-scouring, dyeing, oxidation, and reduction clearing were carried out as in Example 2 with the following exceptions: the dyeing temperature was 115° C., the dyes were C.I. Vat Red 41 (Example 6A), C.I. Vat Blue 1 (Example 6A), and C.I. Vat Orange 15 (Example 6C), the oxidation temperature was 80° C., 4 g of 35 wt % hydrogen peroxide was used, the reduction clearing temperature was 60° C., and the nonionic surfactant used in the reduction clearing step was Dyamul® PC (Yorkshire Chemical Co.). Fabric colorimetric data are given in Table V.

TABLE V

| Example | Initial f(k) | ΔE (after 5 washes) |
|---------|--------------|---------------------|
| 6A | 158 | 0.1 |
| 6B | 16 | 0.9 |
| 6C | 80 | 0.3 |

As shown by the data in Table V, the present process afforded very good depth of shade and excellent washfastness.

EXAMPLE 7

A locknit warp knit fabric of a blend of 44 dtex, 30 filament Dacron® Type 5001 dull poly(ethylene terephthalate) and 44 dtex Lycra® Type 269B spandex (about 80/20 polyester/spandex by weight) was knitted using 28-gauge needles; the greige fabric wale and course counts were 28/cm and 25/cm, respectively. Pre-scouring, dyeing, oxidation, and reduction clearing were carried out as described in Example 2 with the following exceptions: the dyeing temperature was 115° C., the dyes were C.I. Vat Red 41 (Example 7A), C.I. Vat Blue 1 (Example 7A), and C.I. Vat Orange 15 (Example 7C), the oxidation temperature was 80° C., 4 g of 35 wt % hydrogen peroxide was used, and the reduction clearing temperature was 60° C. Fabric colorimetric data are given in Table VI.

TABLE VI

| Example | Initial f(k) | ΔE (after 5 washes) |
|---------|--------------|---------------------|
| 7A | 108 | 0.4 |
| 7B | 215 | 0.1 |
| 7C | 114 | 0.3 |

As shown by the data in Table VI, the present process afforded very good depth of shade and excellent washfastness when used with fabrics comprising spandex and poly (ethylene terephthalate) fiber. Staining by C.I. Vat Blue 1 of six adjacent fabrics during washing was rated "5" (excellent) for each adjacent fabric, a surprising result considering the tendency of dyed spandex to stain other fibers during washing.

EXAMPLE 8

A plain interlock fabric was knitted from 70 dtex, 34 filament false-twist textured Sorona™ poly(trimethylene terephthalate) yarn (a trademark of E. I. du Pont de Nemours and Company) using 28-gauge needles and a 30-inch (76 cm) machine diameter; the greige fabric wale and course counts were 18/cm and 20/cm, respectively. The fabric was pre-scoured, dyed, oxidized, and reduction cleared as in Example 2 with the following exceptions: the dyeing temperature was 115° C., the dyes were C.I. Vat Red 41 (Example 8A), C.I. Vat Blue 1 (Example 8B), and C.I. Vat Orange 15 (Example 8C), the oxidation temperature was 80° C., 4 g of 35 wt % hydrogen peroxide was used, and the reduction clearing temperature was 60° C. Fabric colorimetric data are given in Table VII.

TABLE VII

| Example | Initial f(k) | ΔE (after 5 washes) |
|---------|--------------|---------------------|
| 8A      | 240          | 1.0                 |
| 8B      | 250          | 0.5                 |
| 8C      | 85           | 0.3                 |

As shown by the data in Table VII, the present process afforded excellent depth of shade and washfastness when carried out on fabrics comprising spandex and poly (trimethylene terephthalate) fibers.

EXAMPLE 9

A woven fabric of Nomex® Type 530 aramid (a registered trademark of E. I. du Pont de Nemours and Company) was pre-scoured by placing it in a clean dyepot containing an aqueous solution of 1 g/l Hostapal® FA (a surfactant, Clariant) and sufficient sodium carbonate to bring the pH to 9. The temperature in the dyepot was raised from 25 to 85° C., and the dyeing machine was operated for 20 minutes, after which the fabric was removed and rinsed with warm tap water for 5 minutes and then with cold tap water for 5 minutes.

In preparation for dyeing, C.I. Vat Red 41 was first converted to its vat acid form as follows. To 0.5 g of the dye in 15 ml distilled water was added 1.0 g sodium hydroxide and 1.0 g sodium dithionite at 60° C., and the mixture was stirred for three minutes. If the exothermic dissolution of the sodium hydroxide raised the temperature of the mixture, it was cooled in a water bath or ice bath to minimize dye oxidation. Then 1.0 ml of Matexil® DA-N was promptly stirred into the mixture, and as soon as the mixture no longer exhibited insoluble particles and its color was charateristic of the leuco form, the pH was adjusted to 5.8 with citric acid to form the vat acid dye. Then, the volume of the mixture was adjusted to 25 ml by addition of distilled water, so that the resulting acid dyestock mixture was 2 wt % in dye.

Within about 30 minutes of acid dyestock preparation, all of the dyestock mixture (5 wt % dye based on weight of fiber) was mixed in a dyepot with 170 ml "McIlvaine" buffer, 15 g/l (based on final total bath volume) Matexil® DA-N, and 20 g/l (based on final bath volume) of a sodium dithionite/Rongolit® C mixture (50/50 weight ratio, 47/53 mol ratio). More "McIlvaine" buffer was added to bring the dyebath volume to 200 ml. The scoured fabric was added, the temperature was raised to 130° C. at a rate of 1.5° C./min, and the dyeing machine was operated for 45 minutes at 130° C. Then the dyepot was cooled to 70° C., and the fabric was removed and rinsed in warm tap water and cold tap water for 5 minutes each.

In preparation for dye oxidation, 4 g of 35 wt % hydrogen peroxide was added to 170 ml of distilled water, followed by acetic acid to adjust the pH to 4.5, and enough distilled water to make the final bath volume 200 ml. The dyed fabric was added to the bath (liquor ratio 20:1), the temperature was raised to 85° C., and the dyeing machine was operated for 20 minutes. The dyed, oxidized fabric was rinsed in warm tap water and cold tap water for 5 minutes each.

In a reduction clearing step, 7.5 g sodium hydroxide, 3 g/l Lanapex® R (based on final bath volume), the dyed and oxidized fabric, and 7.5 g sodium dithionite were added to a dyepot, the temperature was raised to 60° C., and the dyeing machine was operated for 15 minutes. The fabric was rinsed in warm tap water for 5 minutes and cold tap water for 5 minutes.

The depth of shade of the dyed fabric was f(k)=119, and washfastness was excellent, f(k)=117 and ΔE=0.65 after five washes.

EXAMPLE 10

A plain plated single jersey of a blend of singles 70 denier (77 dtex) Tencel® lyocell cellulosic (ACORDIS, plc.) and 78-dtex, 34-filament polyester bicomponent yarns of poly (trimethylene terephthalate) and poly(ethylene terephthalate) (20/80 cellulosic/polyester weight ratio) was knitted using 12-gauge needles and a machine diameter of 4 inches (10.2 cm). The fabric was pre-scoured by rinsing it in cold tap water for 10 minutes and then in warm tap water for 10 minutes. The fabric was dyed in two stages with a single dye (Example 10A) and with two dyes (Example 10B).

EXAMPLE 10A

Stage 1: In preparation for dyeing the polyester fibers in the fabric, C.I. Vat Violet I (Towns End) was first converted to its vat acid form as follows. To 0.4 g of the dye in 15 ml distilled water was added 0.8 g sodium hydroxide and 0.8 g sodium dithionite at 50° C., and the mixture was stirred for three minutes. If the exothermic dissolution of the sodium hydroxide raised the temperature of the mixture, it was cooled in a water bath or ice bath to minimize dye oxidation. Then 0.8 ml of Matexil® DA-N was promptly stirred into the mixture, and as soon as the mixture no longer exhibited insoluble particles and its color was characteristic of the leuco form, the pH was adjusted to 5.8 with citric acid to form the vat acid dye. Then, the volume of the mixture was adjusted to 20 ml by addition of distilled water, so that the resulting acid dyestock mixture was 2 wt % in dye.

Within about 30 minutes of acid dyestock preparation, a 5-ml aliquot of the dyestock mixture (1.2 wt % dye based on weight of polyester fiber) was mixed in a dyepot with 170 ml "McIlvaine" buffer, 15 g/l (based on final total bath volume) Matexil® DA-N, and 20 g/l (based on final bath volume) of a sodium dithionite/Rongolit® C mixture (50/50 weight ratio, 47/53 mole ratio). More "McIlvaine" buffer was added to bring the total dyebath volume to 200 ml. The scoured fabric was added, the temperature was raised to 115° C. at 2° C./min, and the dyeing machine was operated for 45 minutes at 115° C. Then the dyepot was allowed to cool first to 80° C., and then to 40° C. by submersion in a cold water bath.

Stage 2: In preparation for dyeing the lyocell fibers in the fabric, C.I. Vat Violet I was first converted to its alkaline leuco form by adding 0.8 g sodium hydroxide and 0.8 g sodium dithionite to 0.4 g of the dye in 15 ml distilled water, adding distilled water to make the total volume 20 ml, and stirring the resulting alkaline dyestock mixture for three minutes at 50° C. If the exothermic dissolution of the sodium hydroxide raised the temperature of the mixture, it was cooled in a water bath or ice bath to minimize dye oxidation.

A 50-ml aliquot was removed from the dyebath of the first (polyester) dyeing stage and replaced with 50 ml of an alkaline reducing solution of 20 g/l sodium sulfate, 20 g/l sodium hydroxide, 20 g/l Lanapex® R, and 15 g/l sodium dithionite. A 5-ml aliquot of the alkaline dyestock mixture (5 wt % dye based on weight of cellulosic fiber) was added to the dyebath, which was then re-heated to 60° C. at 2° C./min and run for 45 minutes at 60° C. This second stage simultaneously reduction-cleared the polyester bicomponent yarn and dyed the lyocell. Finally, the dyed fabric was removed and rinsed in warm tap water for 5 minutes and then in cold tap water for 5 minutes.

To oxidize the dye in both fibers, 200 ml of a pH 4.5 solution of acetic acid having 15 g/l of 35 wt % hydrogen peroxide was put into a dyepot, the dyed fabric was added, the temperature was raised to 80° C., and the dyeing machine was operated for 15 minutes. The dyed, oxidized fabric was rinsed in warm tap water for 5 minutes and in cold tap water for 5 minutes. Then the fabric was soaped by putting it into a dyepot containing 200 ml of a solution of 0.25 g/l sodium dithionite, 3 g/l sodium carbonate, and 3 g/l Lanapex® R, heating the dyepot to 98° C., operating the dyeing machine for 15 minutes, and cooling the dyepot. Finally the fabric was rinsed in warm tap water and cold tap water for 5 minutes each and air-dried at room temperature overnight.

Colorimetric analysis gave an initial f(k) of 72, which was reduced to 58 after five washes, indicating satisfactory depth of shade and washfastness. Overall color change upon washing five times was low ($\Delta E=1.8$).

EXAMPLE 10B

Example 10A was repeated, except that C.I. Vat Red 41 (1.2 wt % based on polyester fiber) was used in the first stage, the vat acid dyeing step was carried out at 60° C., and C.I. Vat Red 13 (7 wt % based on cellulosic fiber) was used in the second stage. Colorimetric analysis gave an initial f(k) of 177, which was reduced to 136 after five washes, indicating very good depth of shade and washfastness. Overall color change after five washings was low ($\Delta E=1.6$).

EXAMPLE 11

Five parts of C.I. Vat Blue 1 was contacted with 10 parts of sodium hydroxide and 10 parts of sodium dithionite in 55 parts of distilled water at 75–80° C. for 3 minutes. Then 5 parts of Matexil® DA-N (anionic surfactant), 8 parts of stearic acid, and enough oleic acid were added to bring the final pH to 7.0. All parts were by weight. The resulting mixture was solidified by cooling it to about 5° C. for three hours. The color of the solid mixture was typical of the acid leuco form (cream-colored). It did not revert to the parent vat (blue) form on standing.

After storage for one week at about 5° C., the polyester bicomponent fabric used in Example 1 was dyed with the solid mixture containing C.I. Vat Blue 1 using the method described in Example 6.

Colorimetric data obtained on the dyed fabric showed very good depth of shade, f(k) of 260, and excellent washfastness: after five washings, f(k) was 255 and $\Delta E$ was 0.2. Stain and rub fastness ratings were all "5".

These results were unexpected in view of the ready oxidizability of leuco vat dyes and sodium dithionite.

EXAMPLE 12

In this Example, various carboxylic acids (formic, citric, acetic, and lactic; Examples A, B, C and D, respectively,) and pH ranges were utilized to make and use the vat acid dye. In each case, the knitted fabric of Example 1 was used.

The fabric was scoured by placing it in a dyepot with 3 g/l Sandozin® NIE (a nonionic surfactant, Clariant International, Ltd.) and 1 g/l sodium carbonate in a clean dyepot. The temperature in the dyepot was raised to 60° C., and the dyeing machine was operated for 30 minutes, after which the fabric was removed and rinsed with cold water for five minutes.

Vat acid dyestock solutions of C.I. Vat Blue 1 were prepared as in Example 1, except that the solution was adjusted to the desired pH with each of the above acids. Each dyestock solution was used within 30 minutes to avoid undue air oxidation.

A series of dyebaths was prepared in a clean dyepot from 190 ml of a "McIlvaine" buffer solution (disodium hydrogen phosphate and each acid) having the desired pH, 2 g Matexil® DA-N (1 wt % based on final dyebath solution), 10 ml of the dyestock solution, and 4 g of hydroxymethylsulfinic acid monosodium salt dihydrate (Rongalit® C) (20 g/l based on final dyebath solution). The polyester bicomponent fabric was added and the temperature was raised to 115° C. at a rate of 1.5° C. per minute. Dyeing was continued at 115° C. for 45 minutes, after which the dyebath was cooled at 2° C./min to 70° C., and the fabric was rinsed with warm tap water and then with cold tap water. The dye was oxidized in the fabric, and the fabric was reduction cleared as described in Example 1.

The fabric samples were spectrophotometrically analyzed, and the results are summarized in Table VIII.

TABLE VIII

| Example | pH | Initial f(k) | After Five Washes f(k) retained (%) | $\Delta E$ |
|---|---|---|---|---|
| A | 5.0 | 210 | 90 | 0.8 |
|   | 5.5 | 227 | 96 | 0.4 |
|   | 5.6 | 237 | 95 | 0.3 |
|   | 5.7 | 292 | 97 | 0.2 |
|   | 5.8 | 276 | 99 | 0.3 |
|   | 5.9 | 262 | 96 | 0.6 |
|   | 6.0 | 242 | 96 | 0.7 |
|   | 6.5 | 230 | 86 | 1.8 |
|   | 7.0 | 197 | 89 | 2.1 |
| B | 5.0 | 201 | 92 | 0.8 |
|   | 5.5 | 223 | 91 | 0.4 |
|   | 5.6 | 232 | 97 | 0.3 |
|   | 5.7 | 277 | 99 | 0.2 |
|   | 5.8 | 274 | 100 | 0.3 |
|   | 5.9 | 255 | 94 | 0.9 |
|   | 6.0 | 229 | 93 | 0.9 |
|   | 6.5 | 218 | 95 | 2.5 |
|   | 7.0 | 177 | 63 | 2.9 |
| C | 5.0 | 294 | 59 | 1.2 |
|   | 5.5 | 215 | 92 | 0.8 |
|   | 5.6 | 222 | 98 | 0.5 |
|   | 5.7 | 238 | 97 | 0.3 |
|   | 5.8 | 231 | 96 | 0.4 |
|   | 5.9 | 225 | 96 | 1.2 |
|   | 6.0 | 220 | 93 | 1.5 |
|   | 6.5 | 212 | 88 | 3.0 |
|   | 7.0 | 163 | 63 | 3.0 |
| D | 5.0 | 182 | 88 | 1.8 |
|   | 5.5 | 209 | 89 | 1.4 |
|   | 5.6 | 221 | 91 | 1.0 |
|   | 5.7 | 233 | 95 | 0.4 |
|   | 5.8 | 228 | 98 | 0.4 |
|   | 5.9 | 222 | 94 | 1.8 |

TABLE VIII-continued

| Example | pH | Initial f(k) | After Five Washes f(k) retained (%) | ΔE |
|---|---|---|---|---|
| | 6.0 | 216 | 92 | 2.0 |
| | 6.5 | 212 | 84 | 3.1 |
| | 7.0 | 156 | 58 | 3.6 |

As can be seen from the data in Table VIII, all pH values and acids used were satisfactory in the operation of the process of this invention. The best results were obtained when the pH was about 5.2–6.5 and especially about 5.5–6.0. The f(k) values obtained in this Example were lower than those in Example 1 because the dyeing temperature was lower here.

Similar results were obtained with C.I. Vat Orange 15. For each of the dyes, acetic, formic, lactic, and citric acids gave similar results. Formic acid and citric acid are preferred because they gave better depth of shade and washfastness than the others.

What is claimed is:

1. A process for dyeing a fiber comprising a synthetic polymer selected from the group consisting of segmented polyurethanes, segmented polyurethaneureas, segmented polyetheresters, polyesters, polyamides, and poly(meta-phenylene isophthalamide), comprising the steps of:
   (a) preparing a vat acid dye by:
      (i) reducing a vat dye with a first reducing agent in water in presence of a surfactant at an alkaline pH; and
      (ii) lowering the pH by the addition of a carboxylic acid;
   (b) forming a dyebath by combining:
      (i) said vat acid dye;
      (ii) an aqueous solution of a carboxylic acid having a pH of about 5.2–6.5; and
      (iii) a second reducing agent in an amount sufficient to maintain said dye in a reduced state, wherein said second reducing agent comprises at least about 20 mole %, based on the total of said second reducing agent, of a compound selected from the group consisting of α-hydroxyalkyl-sulfinic acids having 1–6 carbon atoms, water soluble salts thereof, 1,2,4-trithiolane and mixtures thereof;
   (c) contacting said fiber with said dyebath and heating to at least about 95° C. for a time sufficient to dye the fiber; and
   (d) oxidizing the dye in the fiber.

2. The process of claim 1 wherein the first reducing agent is selected from the group consisting of sodium dithionite, water-soluble salts of hydroxymethylsulfinic acid, and mixtures thereof and wherein said pH in step (b) is about 5.5–6.0.

3. The process of claim 1 wherein the first reducing agent comprises sodium dithionite and the second reducing agent comprises less than about 85 mole %, based on the total of said second reducing agent, of at least one water-soluble salt of an α-hydroxyalkylsulfinic acid.

4. The process of claim 1 wherein the carboxylic acid utilized in step (b)(ii) is selected from the group consisting of citric acid, formic acid and mixtures thereof, and the second reducing agent comprises the sodium salt of hydroxymethylsulfinic acid.

5. The process of claim 1 wherein the carboxylic acid utilized in step (a)(ii) is selected from the group consisting of carboxylic acids having 12–22 carbon atoms and mixtures thereof so that the vat acid dye is in a solid mixture, and the carboxylic acid utilized in step (b)(ii) is selected from the group consisting of acetic acid, formic acid, citric acid, lactic acid, and mixtures thereof.

6. The process of claim 1 wherein step (d) is carried out by adding sufficient oxidant to the dyebath to oxidize both the dye in the fiber and any unutilized reducing agent in the dyebath.

7. The process of claim 1 wherein a further step of reduction clearing the synthetic fiber by cooling the dyebath to no higher than about 95° C. and adding sufficient base to raise the pH to at least about 10 [step (c)(i)], is carried out between steps (c) and (d).

8. The process of claim 7 wherein the synthetic fiber is blended with a cellulosic fiber, and a further step, of adding an alkaline vat dye and adjusting the dyebath temperature to at least about 60° C. so that the cellulosic fiber is dyed, is carried out between steps (c)(i) and (d).

9. The process of claim 8 wherein the cellulosic fiber is cotton, the first reducing agent comprises sodium dithionite, the second reducing agent comprises less than about 85 mole %, based on the total second reducing agent, of at least one water soluble salt of an α-hydroxysulfinic acid, and the carboxylic acid utilized in step (b)(ii) is selected from the group consisting of acetic acid, citric acid, lactic acid, formic acid, and mixtures thereof.

10. A process for dyeing a fiber comprising a synthetic polymer selected from the group consisting of segmented polyurethanes, segmented polyurethaneureas, and segmented polyetheresters, comprising the steps of:
   (a) preparing a vat acid dye by:
      (i) reducing a vat dye with a first reducing agent in water in presence of a surfactant at an alkaline pH; and
      (ii) lowering the pH by the addition of a carboxylic acid;
   (b) forming a dyebath by combining:
      (i) said vat acid dye;
      (ii) an aqueous solution of a carboxylic acid having a pH of about 4.0–6.9; and
      (iii) a second reducing agent in an amount sufficient to maintain said dye in a reduced state, wherein said second reducing agent comprises at least about 20 mole %, based on the total of said second reducing agent, of a compound selected from the group consisting of α-hydroxyalkyl-sulfinic acids having 1–6 carbon atoms, water soluble salts thereof, 1,2,4-trithiolane and mixtures thereof;
   (c) contacting said fiber with said dyebath and heating to at least about 95° C. for a time sufficient to dye the fiber; and
   (d) oxidizing the dye in the fiber.

11. The process of claim 10 wherein the polymer is a segmented polyurethaneurea, the second reducing agent comprises less than about 85 mole %, based on the total of said second reducing agent, of at least one water-soluble salt of an α-hydroxyalkylsulfinic acid, and the dyebath has a pH of about 5.2–6.5.

* * * * *